United States Patent
Berard et al.

(10) Patent No.: US 6,906,817 B1
(45) Date of Patent: Jun. 14, 2005

(54) NETWORK SYSTEM FOR DIRECTING THE TRANSMISSION OF FACSIMILES

(75) Inventors: Jean-Jacques Berard, Villeurbanne (FR); Jean-Marc Dambrosio, Venissieux (FR)

(73) Assignee: Esker, Inc., Madison, WI (US)

(*) Notice: Subject to any disclaimer, the term of this patent is extended or adjusted under 35 U.S.C. 154(b) by 919 days.

(21) Appl. No.: 09/602,367

(22) Filed: Jun. 23, 2000

(51) Int. Cl.[7] .................. G06F 15/00; G06F 17/30; G06K 9/20; G06K 7/10; H04N 1/00
(52) U.S. Cl. ............... 358/1.15; 382/317; 382/321; 358/1.16; 358/440; 707/3
(58) Field of Search ............... 358/1.16, 1.15, 358/440, 401, 403, 442, 508, 1.11; 707/3, 1, 4, 5, 10, 102; 379/93.25, 90.01, 100.08, 100.01, 102.02; 382/317, 321; 709/200, 201, 202, 203, 223, 246; 715/525

(56) References Cited

U.S. PATENT DOCUMENTS 5,608,874 A * 3/1997 Ogawa et al. ............ 709/246
6,487,567 B1 * 11/2002 Michelman et al. ........ 715/525
6,697,165 B2 * 2/2004 Wakai et al. .............. 358/1.11

* cited by examiner

Primary Examiner—Kimberly Williams
Assistant Examiner—Thomas J Lett
(74) Attorney, Agent, or Firm—Quarles & Brady LLP

(57) ABSTRACT

A general document recognition system is described which is intended to be used in connection with an electronic document transmission function used on a computer network. The general document recognition system is set up to recognize any number of document types created by application programs in the network and is also set up with rules as to how to extract destination data from each document type. The extracted data from each document can be the actual intended destination, such as a facsimile telephone number, or can be the identity of the intended recipient individual. If a recipient, rather than a destination, is extracted from the document, the general document recognition system can query a previously designated external database to recover the destination information for that recipient. An LDAP database is the preferred external database for this function.

10 Claims, 3 Drawing Sheets

NETWORK SYSTEM FOR DIRECTING THE TRANSMISSION OF FACSIMILES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In the general field of computer and communications systems, there is a developing convergence such that what was previously considered different categories of office equipment are evolving toward a common or overlapping functionality. For example, laser printers and copiers use similar image creation engines that can often be shared by combination devices which have both printing and copying capabilities. In addition, as all office equipment becomes increasingly automated and computerized, all office and business equipment is becoming part of the computerized local area network or wide area network which interconnects an entire enterprise.

Separately, computer systems that were once considered stand alone are all evolving toward common interconnectivity. At one time, the various computers in an office were all operated separately. Today, the normal business has a network, either a local area network or a wide area network, inter-connecting all of the computers within the enterprise to facilitate work flow among the people who work in the enterprise. Once computerized systems in an office are networked together, it then has become necessary and appropriate to develop tools and methodologies for sharing common resources and for exchanging work files and data, even between modes of communication that were once considered quite distinct.

An example of the once distinct technology now being embedded in the modem network and computerized work environment is the technology of facsimile document transmission. Originally facsimiles started as separate devices which were capable of transmitting what is, in effect, a bit mapped version of a document through defined protocols over a telephone connection to a remote dedicated facsimile device which was capable of reproducing the bit map pattern at the remote station. While stand-alone facsimile devices certainly still exist, it has become common to incorporate a facsimile transmission and reception function into computers and computer networks having other diverse and integrated functions. Accordingly, it is common today for computers, whether networked or not, to have direct modem transmission and reception capability.

The function of facsimile transmission can become more complicated in a network environment. Often it is desired that users anywhere on a computerized network be able to send facsimiles from a common facility to outside the enterprise. In a typical present embodiment of an automated facsimile system, the system requires that proprietary tags be attached to each document that are sent to a dedicated server which functions as the output device for the facsimile function in this system. The proprietary tags contain information, like the intended recipient facsimile number, that is needed to route the application output as a facsimile. The nature of the proprietary tags depends on the particular vendor supplying the networked facsimile transmission system for that business. These systems suffer from the drawback that such proprietary tags are required in order to properly direct a facsimile throughout a system. Many times an enterprise has many users who are comfortable with, and have been using for many years, applications which are no longer current. These are sometimes referred to in the computerized industry as legacy applications. When an enterprise has a large investment, either financial or human, in given legacy applications, the customers have no desire to lose the applications and to modify or change the applications which they use merely to add the additional capability of having automated facsimile capability integrated into their work station. Since the functionality of most prior facsimile transmission systems depends on proprietary tags, and because most legacy systems will not have the capability to add such tags, this may limit the applicability of automated facsimile systems in networks for large enterprises.

What is needed therefor is a methodology to provide a way to automate the transmission of facsimile transmissions from a network system which may contain legacy applications creating documents in unique formats and without proprietary tags attached.

BRIEF SUMMARY OF THE INVENTION

The present invention is summarized in a method for operating a computer network to direct the transmission of a document by facsimile transmission that uses a method of general document recognition. The general document recognition method receives a document from a user on the network to be transmitted to a recipient, and first tests the document against a set of previously defined rules to determine which document type, from a set of previously identified document types, matches the document. Then the systems extracts data from the document, based on previously defined rules associated with that document type, the extracted data identifying either the intended destination or the intended recipient of the document. If the extracted data identifies the intended destination of the document, the system then sends the document by facsimile transmission to that destination. If the extracted data identifies only the intended recipient, then the system sends a query to a database containing destination information associated with a pre-defined set of recipients. The query identifies the recipient and requests as a response a destination associated with the intended recipient. Upon a response to the query, the system sends the document by facsimile transmission to that destination identified in the response.

It is a preferred variant of the present invention that an external LDAP data base is the data base which is queried to obtain identification of the destination associated with the recipient.

It is a useful advantage of the general document recognition system that it is capable of processing documents of any type or format without the originating application being modified in any way and without the documents being specially tagged.

It is an object of the present invention to define a general document system that can be used with a facsimile transmission function to transmit any type of document from anywhere in the network of an enterprise to the correct intended recipient.

Other object, advantages and features of the present invention will become apparent from the following specification.

DETAILED DESCRIPTION OF THE INVENTION

Figure 1:
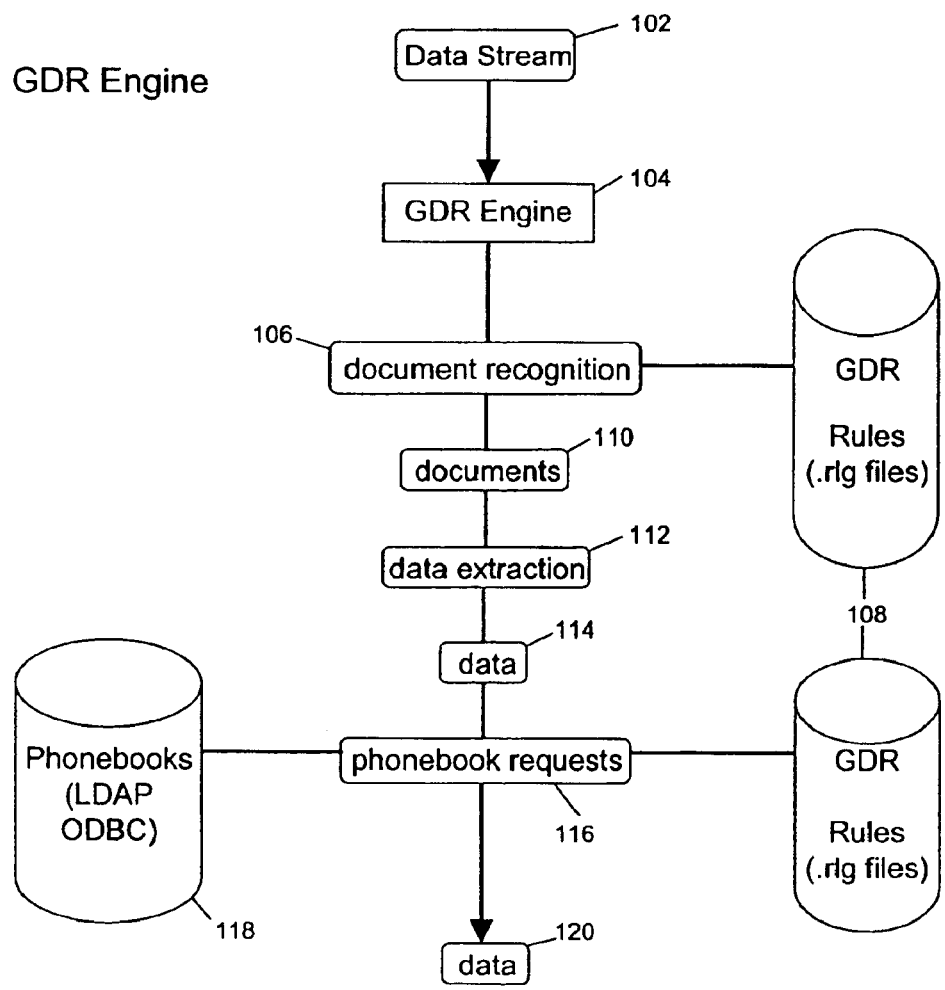
FIG. 1 is a schematic illustration of an overview of the generalized operation of a general document recognition system construction in accordance with the present invention.

The system described herein functions, in summary, as follows. A system administrator for a local network or computer system goes through a series of interactions with the computer software to define document types. These document types will represent the general categories of documents created within the organization that are to be processed by the general document recognition software. The document types can cover any of the types of documents created by any of the computer software used within the network of the organization, and the document types themselves do not need to be specially formulated or formatted, as long as the document type is properly defined. In the process of defining the document type, the system administrator will indicate to the general document recognition software where on that type of document to look for information as to the addressee of the facsimile to be sent. The administrator thus sets up the system to extract data from the specified area of the defined document type, the data being information representing the ultimate destination intended for the document. This data may, but does not need to, include the telephone number of the facsimile, but does need to include identifying information about the intended recipient of the document. If the facsimile telephone number or other destination information is in the document, the document can be routed directly to the facsimile transmission server for transmission. If the data retrieved identified the recipient but not the facsimile telephone number of the recipient, the system looks up the appropriate telephone number in a directory.

The preferred embodiment of this system uses an LDAP directory and refers to the LDAP directory to find the intended destination for the document The advantage of the use of the LDAP directory is that it is a standard form of shared directory information that can be used or accessed by various users or various application programs located throughout the network of the enterprise using the system.

This document recognition system described here (sometimes referred to as a General Document Recognition system, or GDR) is intended to operate in conjunction with a facsimile and other document handling system attached to the general computer network of an enterprise. Several commercial facsimile handling software packages are available in the marketplace. The embodiment of the GDR system described here was designed to operate with the Faxgate software system from Esker, Inc. Such facsimile and document handling systems are intended to receive a document from a user on the network, a document intended to be sent by facsimile transmission or other form of electronic transmission to a recipient outside of the enterprise. Typically, the document to be transmitted is sent to a facsimile server or other communication server that transmits the document out on a telephone connection. When all of the software on an enterprise network is entirely integrated, the various applications can be configured to include proprietary tags on each facsimile request. When a system includes non-integrated or older legacy applications, the alternative of using proprietary tags may not be available. The implementation of a GDR system permits the routing of facsimile transmissions through the computer network of an enterprise regardless of the format of document and without the need for proprietary tags in the documents to be sent.

Then, when a user sends a fax using any client software resident on the computer system, the client composes the document in any of the formats which are recognized by the GDR system. The document is then transmitted to the GDR system. The GDR system then uses its document types to discern which of the document types the current document is. Then, based on the rules attached to that document type, the data as to the ultimate intended recipient of the fax is abstracted from the document currently handling. That information is then used on the LDAP lookup table to find the telephone number for the ultimate addressee of the facsimile, and the system proceeds to send the fax out to its intended recipient using the telephone number contained in the LDAP lookup table.

The details of the functioning in this system can be better understood by referring to a series of flow charts attached hereto as drawing figures.

Figure 2:
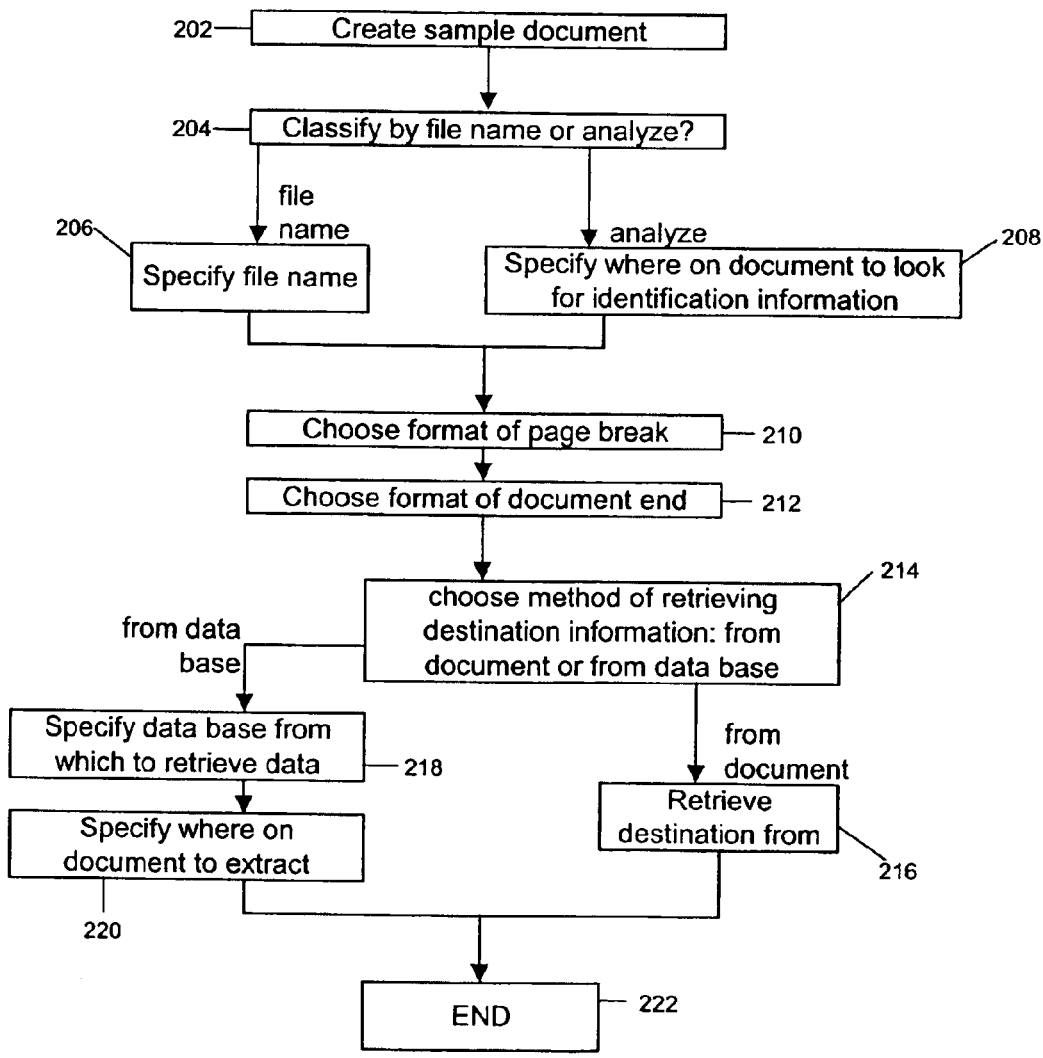
FIG. 2 is a flowchart diagram illustrating a portion of the document recognition setup of a computer software system constructed in accordance with the present invention.

In the flowchart of FIG. 2, the general process steps in the GDR document type definition process is illustrated. This is the process performed by the system administrator to define a document type that will thereafter be recognized by the GDR system. First, a sample of the document type is created, in the step indicated at 202. In accordance with conventional current theories of software design, the steps described in FIG. 2 are implemented through a standard window functionality, known as "wizards," which provide the user with graphical templates to guide the user, in this case the system administrator, through the process of defining each document type. The first wizard would ask the user or system administrator to create or open the sample document as illustrated at step 202 in FIG. 2. If the user does not know the file extension of the document desired, a browsing option can be implemented as an interface to the user of the system to permit the user to look in the storage devices of the system for the desired sample document. The specified sample document would then be brought up on the display of the administrator. The second step is that the system then queries the user as to whether or not the document type is to be classified from its file name alone or is to be analyzed according to its contents. This step is illustrated at 204. If the document is to be recognized from its name alone, the user is then asked at step 206 to specify the characteristic of the file name that will be recognized. What is contemplated here is the recognition of, in particular, a suffix that designates a type of document to be recognized, such as the common "txt" suffix used for text files. If the document is to be recognized from its contents, then the user is directed at step 208 to specify an area of the text document in which the system is to look for information that would help the system identify the document type. The user is permitted to use a graphical interface device, such as using a mouse to select an area in the sample document on the display screen, to specify in which portion of that type of document the system is to look for information as to document type. The characterizing information can be a character string or any other information that can be used to identify the particular document type. For example, the administrator at step 208 may define one or more lines of text or characters which are defined to be the characterization of a particular document type. A document type definition might be defined such that if the text string "MEMO" is found in the center top of the document, then the document is characterized as the type MEMO. The system stores information representing the definition created by the administrator so that the system can know that if it finds the text, or whatever else has been defined to be characteristic of that document type, then it can assign the document to the document type associated with that text.

In the next two steps, the user is asked to specify how a new page and a new document are delineated for that particular document type. This, of course, is so that the system knows where to insert page breaks in the transmission of the facsimile. Again, in standard windows format, a series of radio buttons or other selections can be provided from which the user can choose appropriate selections. The user selects the type of format used on that document to represent the end of a page, or a page break, and also selects what format or character represents a document break, and what format or character represents the end of that type of document. The character string or format used to designate page breaks or end of documents can thus vary from document type to document type. These steps are indicated at 210 and 212 in FIG. 1.

Then, the system is instructed where to look on documents of that type for the main data item that the system wants to find. That data item is the ultimate intended recipient of the document. For any given document type, the user is provided with two options. The first option is to look within the document itself for the person and the destination data. The other option is to look in the document for the identification of the recipient and then look in the phone book for the system to find the destination information for that recipient. The choice of which of the two methods is to be used is indicated at Step 214. If the information as to the destination of the document is to be recovered from the document itself, then at step 216 the user is asked to specify where in the document to look for that information. This information can be in the form of a geographic indication to the system as to where physically on the document type to look for a telephone number that would be the facsimile number to which the document is to be sent. Alternatively, the system can search for a string which is presumed to be a usual predicate of the facsimile telephone number. Such a typical string might be "fax number:", the system then assuming that whatever numerical string follows that text string is the facsimile number to which the facsimile is to be sent.

The alternative, indicated at step 218, is to extract a recipient name from the document and then refer the system to a databank to find the facsimile telephone number of the intended recipient. The GDR system is set up to recognize several databases, or phone books, to access the needed information. With this alternative, the system is set up for a given document type to extract from the document the name, department, title or other identification of the intended recipient of the facsimile. The parameters of the document type, entered by the system administrator, designate which among several different databases the system is to look for the destination information for a particular document type. The databases can include a special database of telephone numbers set up for the facsimile transmission function or, most preferably, can be a LDAP database used by the network. The acronym LDAP (Lightweight Directory Access Protocol) is a protocol for addressing on-line directory services over TCP/IP, and is a standard supported by many vendors. The LDAP directory is a collection of attributes with an unambiguous assigned name called a distinguished name (DN). The DN has associated with it various attributes of the individual associated with the DN such as alternative names, address, and including, in this instance, the person's facsimile telephone number. The system thus set up to retrieve from the document a name or identification of the intended recipient and use that information to query the LDAP database for the facsimile telephone number of that intended recipient. Note that the LDAP database can be maintained in a remote server as long as that server can be accessed on-line.

While use of the LDAP database is preferred, it is intended that the system can be configured to access any suitable database to find the needed information. The set-up parameters should permit the designation of other external databanks as the data source to access to identify where to send a facsimile of a particular document type.

The specification of where the system is to find recipient destination information is the end of the document type definition process illustrated in FIG. 2. This process thus terminates at step 222.

In the operation of the GDR system to process an actual document, the data flow follows the general plan that was used in the document type set up process. This flow is illustrated in FIG. 1. A data stream is initiated by a user who wishes o send a facsimile, as indicated at 102. The user has created a document that fits within one of the predefined document types that the GDR system has been set up to process. The user invokes a command at the user's workstation to send information about the document he or she wishes to transmit to the GDR system engine. This step is indicated at 104. The system then begins the document recognition process, as indicated at 106. This process consists essentially of analyzing the document to determine which of the various document types previously defined by the system administrator can be applied to the current document. The GDR system access, the databank of GDR rules, indicated at 108. The rules are, in this instance, the definitions created by the system administrator for the various recognized document types. As stated above, the rules can be based on the name of the document, can be based on test string of the document, or can be based on any other information contained within the document that can be identifying of document type.

At step 110, it is assumed that the GDR system has been able to associate the input document with one of the previously defined document types. Then the system performs the data extraction step, indicated at 112, to derive from the document itself information to identify the intended recipient. As explained earlier during the description of system set-up, the data extraction can involve the system retrieving data from a defined geographic location on the document type or it can involve the system scanning the text of the document to look for a text string used to identify the recipient. Again the GDR system accesses the document rules, indicate at 108, for instructions on how to accomplish this data extraction. The result of that step is the creation of a data item, indicated at 114, which identifies the recipient to whom the document is to be sent. This information may or may not include, at this point, the facsimile telephone number of the intended recipient. At step 116, the system makes a request to an external database, or phone book, indicated at 118 to find the facsimile telephone number for the intended recipient. The system first looks in the GDR rules database to determine for that type of document which phone book database is to be used. Based on the rule for that document type, the system then issues a query command to the appropriate database, internal or external, asking for the return of the facsimile telephone number of the recipient. The result, indicated at 120, is that the system has all the needed information to send the facsimile to the recipient. The document can then be passed to the facsimile transmission sever for e-mail or telephone transmission to the recipient.

Figure 3:
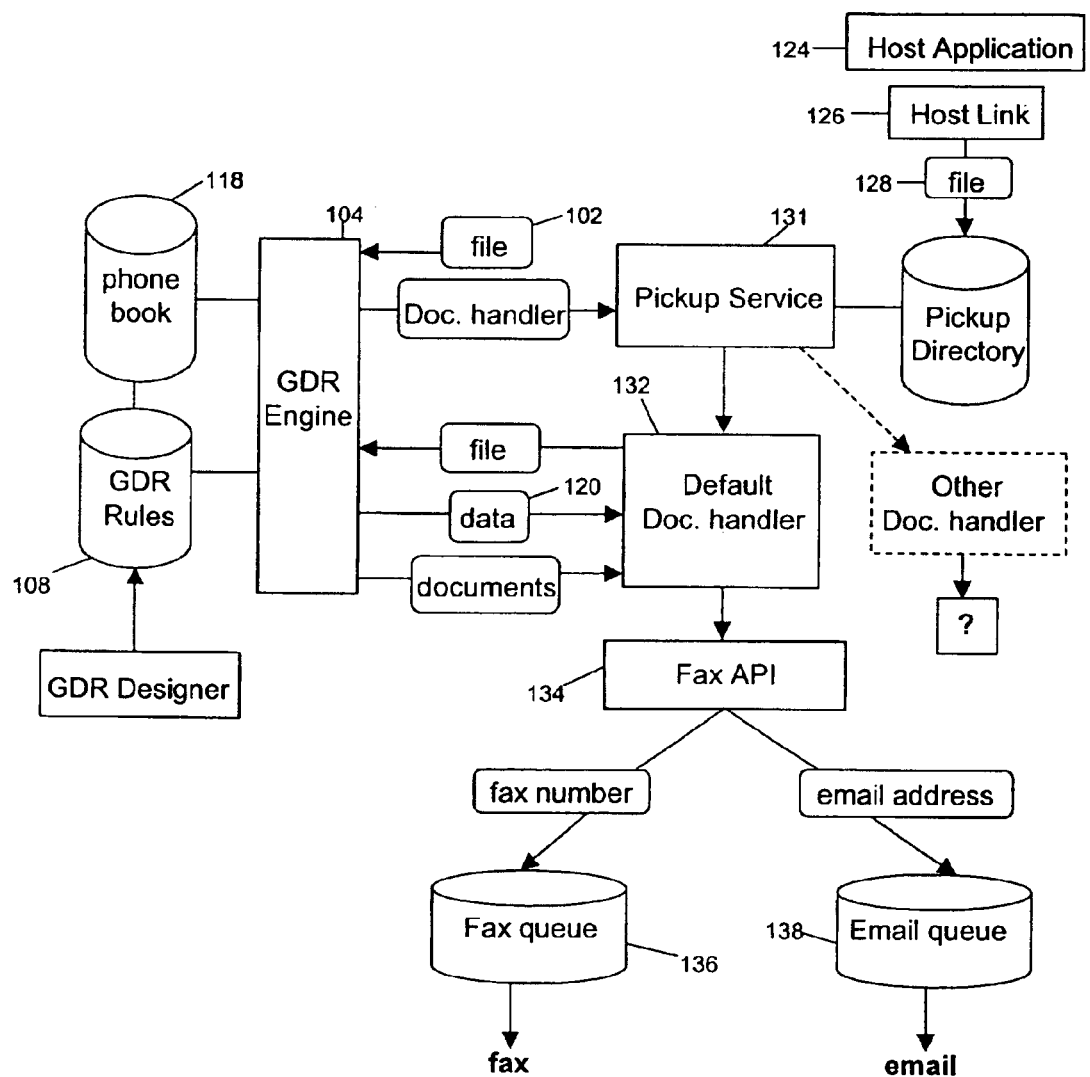
FIG. 3 is a schematic illustration of an overview of how the general document recognition system fits within the network system environment of an enterprise.

Shown in FIG. 3 is an overview of the logical manner in which the GDR system is integrated into the network workflow. A user uses a host application, indicated at 124, or a host link, indicated at 126 to create a document to be sent. The document is represented in file 128. The user indicates to the network that the document is to sent by the GDR, and in response, a copy of the document is placed in a pickup directory indicated at 130. A utility program, known as a pickup service, polls the pickup directories in the network and transfers the documents to the GDR engine 102.

The GDR system engine 102, operating as described in the flowchart of FIG. 1, then accesses the GDR rules and the designated phone book database or databases to determine the ultimate address for transmission of the document. The document and the destination data are passed to a document handler utility 132, which passes on the document to the API 134. The FAX API 134 (an Application Programming Interface) is a dynamic library of the Faxgate software system to permit the delivery of documents into the Faxgate system using high level commands. The Fax API 134 sends the document along to the fax queue 136 or the e-mail queue 138, whichever is designated by the phone book as the preferred method to reach the recipient. The FAX API 134 may also be described as a general purpose delivery API capable of receiving instructions to send the document by any electronic delivery methodology.

Note that it is an advantage of this methodology that the functionality of the GDR system is entirely independent of the original application used to create the document. Thus the host application does not have to add any proprietary tags or other coded information in order for the document to be sent to the correct intended recipient. As long as the document recognition rules and the data extraction rules are properly set up by the system administrator, any type or document of any format can be handled and transmitted without alteration of the format of the document itself. Thus older or legacy applications can still be used without modification. Note that at no point in this process was the document in any way limited as to type or style. This system can be used with documents, forms, images, data files or any other form of file. In essence, the application making the document does not need to be altered at all for its documents to be transmitted by the facsimile function of the network. The GDR document recognition and data extraction functions have provided a method to route the file to the correct destination, without the originating application being modified in any way.

It is also specifically intended that this same GDR system can be used for other forms of document handling, recognition, and transmission besides facsimile transmission. Note that in FIG. 3, an alternative method of transmission of the document to the recipient is e-mail transmission. It is intended that the basic concept described here is independent of the actual form of data transmission used to send the document to the intended recipient. What is important here is that the document can be unchanged in format completely from what is created by its native application, and that the system can be set up to both recognize the document type and to transmit that document to its intended recipient based on data extracted from the document. For example, it is envisioned that one parameter associated with document type could be the intended mode of data transmission to the recipient, i.e. either facsimile or e-mail. Thus the system is a general document recognition engine not limited to the particular form of data transmission used for the document.

We claim:

1. A method for operating a computer network to direct transmission of a document from a user on the network to an intended recipient not on the network by electronic transmission using a method of general document recognition, the general document recognition method comprising the steps of (a) receiving a document from a user on the network to be transmitted to a recipient;

(b) testing the document against a set of previously defined rules to assign to the document a document type from a set of previously identified document types;

(c) extracting data from the document, based on previously defined rules associated with that document type, the extracted data identifying the either the intended destination or the intended recipient of the document;

(d) if the extracted data identifies the intended destination of the document, then sending the document by facsimile transmission to that destination;

(e) if the extracted data identifies the intended recipient for the document, then: (i) sending a query to a database containing destination information associated with a pre-defined set of recipients, the query identifying the recipient and requesting as a response a destination associated with the intended recipient, and (ii) upon receiving a response to the query, sending the document by electronic transmission to that destination.

2. A method as claimed in claim 1 wherein the document type is identified by the name of the file containing the document.

3. A method as claimed in claim 1 wherein the document type is recognized by a test string contained in the document.

4. A method as claimed in claim 1 wherein the system organizes the document by pages based on rules associated with the document type.

5. A method as claimed in claim 1 wherein during the data extraction step, if instructed to do so by the rules associated with that document type, searching the document for a character string associated with destination information.

6. A method as claimed in claim 1 wherein during the data extraction step, if instructed to do so by the rules associated with that document type, searching the document for a recipient identifier.

7. A method as claimed in claim 1 wherein the data base of recipients in an LDAP database.

8. A method as claimed in claim 1 wherein the electronic transmission of the document is by facsimile transmission.

9. A method as claimed in claim 1 wherein the electronic transmission of the document is by e-mail transmission.

10. A method for operating a computer network to direct transmission of a document from a user on the network to an intended recipient not on the network by electronic transmission using a method of general document recognition, the general document recognition method comprising the steps of (a) receiving a document from a user on the network to be transmitted to a recipient not on the network;

(b) in the network, testing the document against a set of previously defined rules to assign to the document a document type from a set of previously identified document types;

(c) extracting data from the document, based on previously defined rules associated with that document type, the extracted data identifying the either an intended destination by telephone number or an intended recipient of the document;

(d) if the extracted data identifies the intended destination of the document, then sending the document by facsimile transmission to that destination telephone number, (e) if the extracted data identifies the intended recipient for the document, then: (i) sending a query to a database containing destination information associated with a pre-defined set of recipients outside of the network, the query identifying the recipient and requesting as a response a destination telephone number associated with the intended recipient, and (ii) upon receiving a response to the query, sending the document by electronic facsimile transmission to that destination telephone number provided by the database.

\* \* \* \* \*